March 22, 1927.  E. L. SCHELLENS ET AL  1,621,606
TRUCK
Filed May 15, 1925
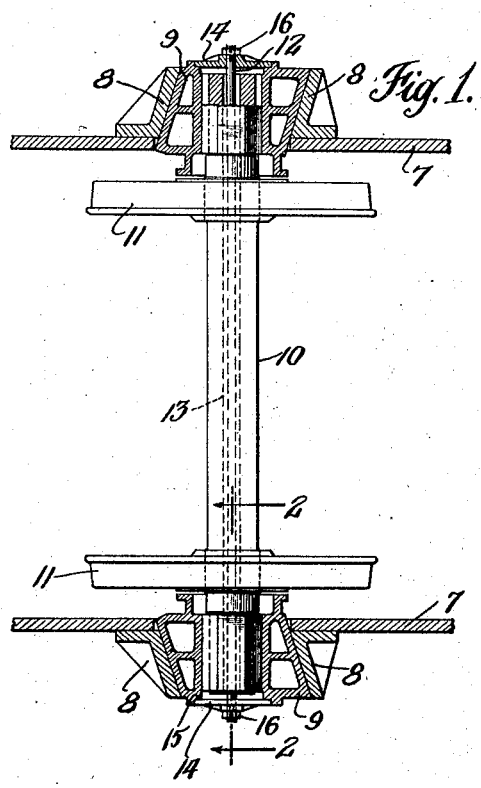
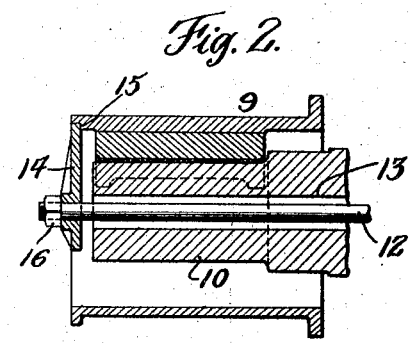
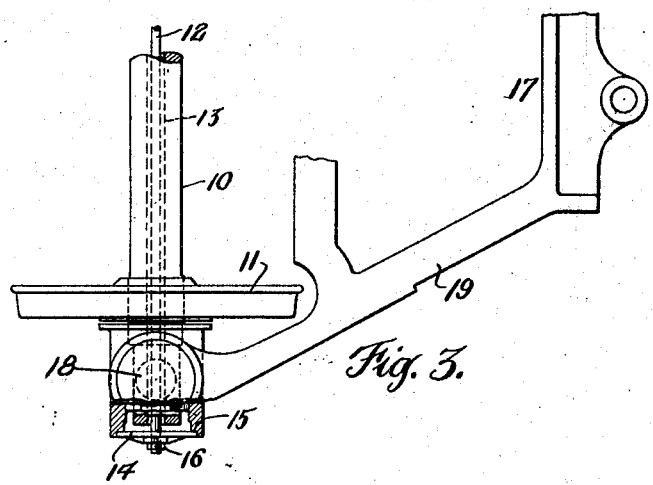
INVENTORS
Eugene L. Schellens and
Joel S. Coffin Jr.
BY
Synnestvedt & Lechner
ATTORNEYS Patented Mar. 22, 1927.

1,621,606

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C-S ENGINEERING COMPANY, A CORPORATION OF DELAWARE.

TRUCK.

Application filed May 15, 1925. Serial No. 30,435.

This invention relates to improvements in trucks and is especially useful in connection with locomotive trailer trucks.

In certain types of trailer trucks, such as the "Vaughan" truck, for example, the boxes have capacity for transverse movement but are not fixed relative to one another and hence difficulties are encountered in service as a result thereof.

We propose to tie or fix the boxes of this character with respect to one another in a manner to overcome these difficulties.

In certain other types of trucks, such as the open frame truck disclosed in our copending application Serial No. 576,617, filed July 21, 1922, it is also desirable to fix the boxes with respect to one another and we aim to accomplish this in a simple and effective manner.

The foregoing, together with such other objects as may hereinafter appear, or are incident to our invention, we accomplish by means of a construction which we have illustrated in preferred form in the accompanying drawings, wherein:

Fig. 1 is fragmentary sectional plan view showing our invention applied to a "Vaughan" truck;

Fig. 2 is a sectional view taken on the line 2—2 of Fig. 1; and

Fig. 3 is a fragmentary plan view showing our improvement applied to an open truck frame.

Referring now to Fig. 1, the reference numeral 7 indicates a portion of the frame of a trailer truck, of the Vaughan type, such frame being provided with bearing jaws 8 for receiving the movable bearing boxes 9. The axle 10 of the truck, having the wheels 11 has its bearing in the boxes 9, there being a suitable bearing brass provided in such boxes.

The boxes 9 are free to move vertically in the jaws 8 as well as transversely of the truck, such transverse movement taking place for instance when the locomotive is curving.

In the ordinary construction of such trucks the boxes 9, 9, are not fixed relative to one another in consequence of which excessive wear of the bearing parts takes place, often causing serious difficulties; such for example as sliding of the boxes longitudinally of the axle. In order to overcome the difficulties which may arise from present construction we have tied or connected the boxes 9, 9 together by means of a rod 12 extending thru the axle 10 which axle is made hollow as indicated at 13.

Adjacent each end of the rod 12 we have provided a clamping plate 14 which engages the recessed portion 15 in the outer face of the box 9. Thus it will be seen that by securing the rod 12 and the clamping plates 14, 14 in place by means of the nuts 16, the boxes 9, 9 are tied together and will move as a unit.

Hence when thrusts are imparted which tend to move one of the boxes, the other is moved with it by virtue of the tying means, thus preventing displacement of one box relative to the other and avoiding the wear incident to existing structures.

Referring to Fig. 3, it will be seen that we have here shown our improvement applied to an open truck frame 17 in which frame the boxes are fixed at 18 against transverse movement, it being apparent, however, that the thrusts imparted to the boxes have a tendency to spread the arms 19 of the truck frame. By the employment of our novel arrangement of tying the boxes such tendency is eliminated because all of the thrusts are taken up by the rod 12.

Our invention may be applied to other types of trucks without departing from the scope of the invention and such applications will occur to those familiar with the art.

We claim:

1. A radial trailer truck for locomotives comprising in combination a frame with one end open and the other adapted to be pivoted to the locomotive, an axle having wheels, boxes for said axle at the open end of said frame, and tying means for fixing the boxes relative to one another.

2. A radial trailer truck for locomotives comprising in combination a frame with one end open and the other adapted to be pivoted to the locomotive, an axle having wheels, boxes for said axle at the open end of said frame, and a tie member extending through said axle and connecting the boxes as against independent relative movement.

In testimony whereof, we have hereunto signed our names.

EUGENE L. SCHELLENS.
J. S. COFFIN, JR.